United States Patent
Yang et al.

(10) Patent No.: US 11,290,268 B2
(45) Date of Patent: Mar. 29, 2022

(54) MODE SWITCHING WITH MULTIPLE SECURITY CERTIFICATES IN A WIRELESS DEVICE

(71) Applicant: Apple Inc., Cupertino, CA (US)

(72) Inventors: Xiangying Yang, Cupertino, CA (US); Li Li, Los Altos, CA (US)

(73) Assignee: Apple Inc., Cupertino, CA (US)

(*) Notice: Subject to any disclaimer, the term of this patent is extended or adjusted under 35 U.S.C. 154(b) by 213 days.

(21) Appl. No.: 16/566,723

(22) Filed: Sep. 10, 2019

(65) Prior Publication Data

US 2020/0092095 A1 Mar. 19, 2020

Related U.S. Application Data

(60) Provisional application No. 62/731,010, filed on Sep. 13, 2018.

(51) Int. Cl.
| | | |
|---|---|---|
| *H04L 9/08* | (2006.01) | |
| *H04L 9/32* | (2006.01) | |
| *H04L 29/06* | (2006.01) | |
| *H04W 8/18* | (2009.01) | |

(52) U.S. Cl.
CPC .......... *H04L 9/0877* (2013.01); *H04L 9/3263* (2013.01); *H04L 63/0823* (2013.01); *H04L 63/0892* (2013.01); *H04W 8/186* (2013.01)

(58) Field of Classification Search
None
See application file for complete search history.

(56) References Cited

U.S. PATENT DOCUMENTS

2014/0019955 A1   1/2014   Summerer
2014/0329502 A1 * 11/2014   Lee .................. H04W 12/04
                                                            455/411

FOREIGN PATENT DOCUMENTS

EP   2448215 A1   5/2012
EP    277958 A1   9/2014

OTHER PUBLICATIONS

European Patent No. 19196968.2—Extended European Search Report dated Dec. 20, 2019.

* cited by examiner

*Primary Examiner* — Brandon S Hoffman
(74) *Attorney, Agent, or Firm* — Dickinson Wright RLLP

(57) ABSTRACT

This application describes various embodiments to manage multiple security certificates in a wireless device, including switching between different security certificates to support different functions, including supporting connectivity for multiple industry sectors that use different certificate authorities, and/or supporting different operational modes that require different security certificates for performing administrative functions. The wireless device includes a smart secure platform (SSP) or an embedded Universal Integrated Circuit Card (eUICC) that stores multiple security certificates to use for different industry sectors and/or for different operational modes.

20 Claims, 14 Drawing Sheets

MODE SWITCHING WITH MULTIPLE SECURITY CERTIFICATES IN A WIRELESS DEVICE

CROSS-REFERENCE TO RELATED APPLICATIONS

The present application claims the benefit of U.S. Provisional Application No. 62/731,010, entitled "MODE SWITCHING WITH MULTIPLE SECURITY CERTIFICATES IN A WIRELESS DEVICE," filed Sep. 13, 2018, the content of which is incorporated herein by reference in its entirety for all purposes.

FIELD

The described embodiments set forth techniques to managing multiple security certificates in a wireless device, including switching between different security certificates to support different functions, such as to support connectivity for multiple industry sectors that use different certificate authorities, or to support different operational modes that require different security certificates.

BACKGROUND

Wireless devices continue to proliferate for a wide array of uses. As such, multi-functional wireless devices that incorporate different radio access technologies and can be programmed to handle different tasks are supplanting individual limited-function wireless devices. Security certificates and credentials are used for authentication and/or authorization to gain access to wireless services and/or to verify messages or content are provided by trusted entities. Different industry sectors (also referred to as market segments) can use security certificates generated by different certificate authorities, and no global certificate authority to handle security certificates for all industry sectors exists or is anticipated to exist. Secure processing elements of current wireless devices, such as used for cellular wireless network authentication or for wireless payment processing are typically dedicated to servicing a single market segment and to use a single security certificate for an array of functions. Improved flexibility in managing security certificates for multiple industry sectors in a multi-functional wireless device is desired.

SUMMARY

Various embodiments are described herein that relate to managing multiple security certificates in a wireless device, including switching between different security certificates to support different functions, such as to support connectivity for multiple industry sectors that use different certificate authorities, or to support different operational modes that require different security certificates for performing administrative functions. Flexible secure processing elements, such as a smart secure platform (SSP), can provide security functions, such as authentication and/or authorization to access services or to perform administrative actions, for a wireless device. Different industry sectors can have different security certification requirements to perform various functions and may use different security certificates issued by different certificate authorities. An SSP can be programmed to support different industry sectors, such as telecom or payment processing, by loading an operating system (OS) bundle, which includes a combination of operating system code, applets, and metadata, into the SSP. The OS bundle is uniquely identified by a bundle family identifier that includes one or more digits that identify the industry sector supported by the OS bundle. The SSP includes one or more certificates to use for functions associated with administrative operations or access to services for one or more industry sectors. During execution of a management function, such as an administrative operation or authentication/authorization to access services, the SSP uses an applicable certificate based on an indication of which industry sector is associated with the OS bundle that seeks to execute the management function. In representative embodiments, the SSP uses a telecom certificate to provision a telecom OS bundle from an image discovery service (IDS) that uses the same or a parallel telecom certificate for the provisioning process. Both the telecom certificate used by the SSP and the corresponding telecom certificate used by the IDS are issued by the same certificate authority (CA). The IDS verifies a request for provisioning of the OS bundle based on a signature provided in the request, the signature generated based at least in part on the telecom certificate. The SSP verifies a downloaded OS bundle and associated metadata provided by the IDS during the provisioning process using the telecom certificate.

An embedded Universal Integrated Circuit Card (eUICC), which stores electronic Subscriber Identity Modules (eSIMs) for a wireless device, represents a specific version of an SSP. Administrative operations, such as remote SIM provisioning (RSP) processes, can require the wireless device to use appropriate operational modes when interfacing with a network entity according to an RSP process version supported by the network entity. The eUICC can include different certificates provided by different certificate authorities (CAs), such as a first certificate issued by a first CA to support a first RSP process used by a first network entity, and a second certificate issued by a second CA to support a second RSP process used by a second network entity. Alternatively, the certificates can be issued by the same CA but still be dedicated for use with different network entities that use different RSP processes. In some embodiments, a local profile assistant (LPA) or other comparable process executing on hardware of the wireless device external to the eUICC determines an applicable certificate supported by a network entity with which a secure connection is established to perform a management function, such as an RSP process, and sends a command to the eUICC to use a particular operational mode associated with the applicable certificate. The eUICC selects the applicable certificate for signing messages and/or for verifying content and switches to the particular operational mode (if required) based on the command from the LPA. In some embodiments, the LPA determines the particular operational mode and/or the applicable certificate based on information obtained prior to initiating the RSP process. In some embodiments, the LPA determines the particular operational mode and/or the applicable certificate after initiating the RSP process, such as during a transport layer security (TLS) establishment between the LPA and the network entity, such as a subscription manager data preparation (SM-DP) server. In some embodiments, the eUICC selects the particular operational mode and/or the applicable certificate based on a message relayed by the LPA from the network entity, where the message is signed with a security certificate by the network entity. In some embodiments, the eUICC uses a key identifier included in the message signature to determine the applicable certificate and operational mode for the RSP process. In some embodiments, the LPA determines the network entity requires a particular operational mode or uses a particular version of a certificate prior to the eUICC receiving the message signature and adjusts any messages communicated by the eUICC to the LPA for forwarding to the network entity to align with determined particular operational mode or particular version of certificate required by the network entity.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, where like reference numerals designate like structural elements.

DETAILED DESCRIPTION

Figure 1A:
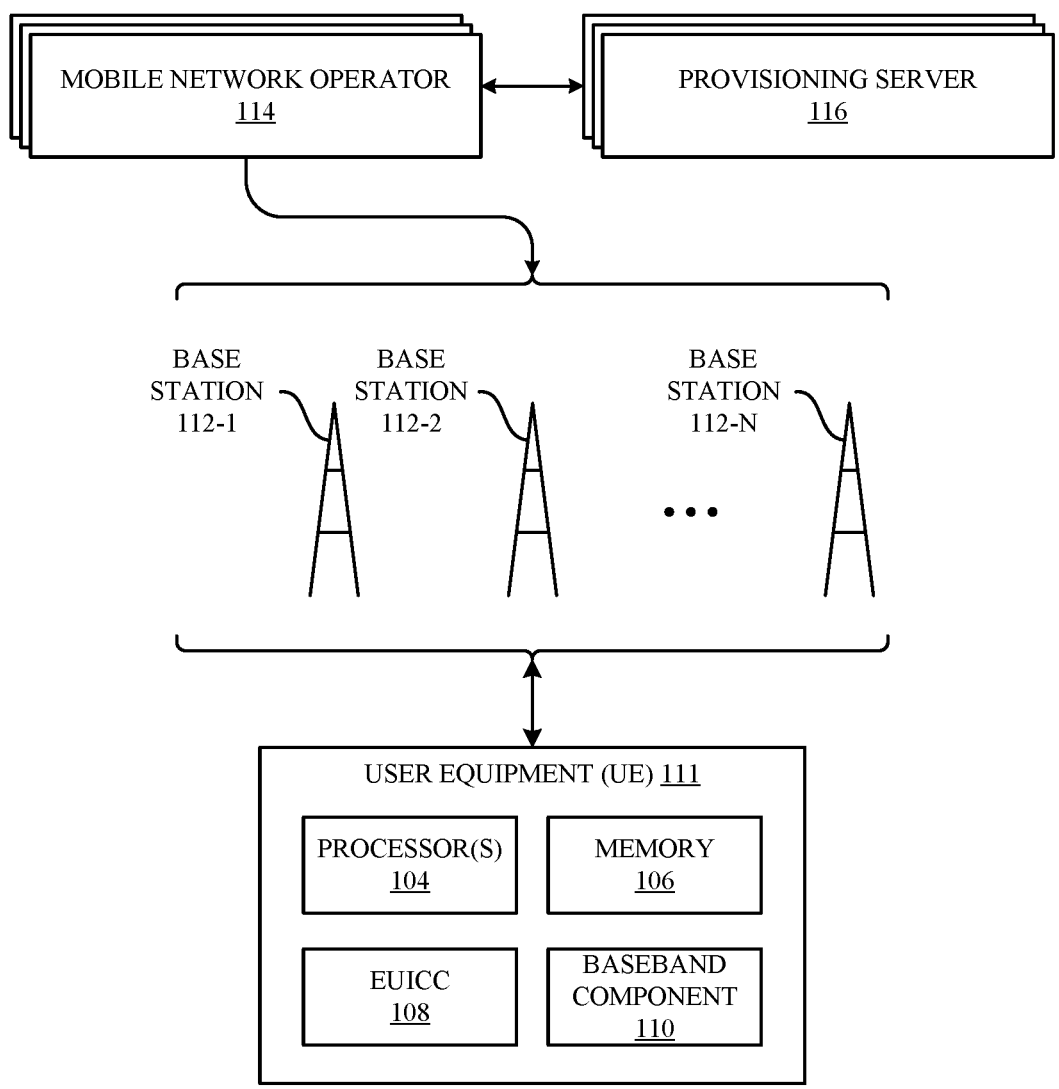
FIG. 1A illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This paper describes various embodiments that relate to managing multiple security certificates in a wireless device, including switching between different security certificates to support different functions, such as to support connectivity for multiple industry sectors that use different certificate authorities, or to support different operational modes that require different security certificates for performing administrative functions. Ongoing standardization efforts by the Global System for Mobile communications Association (GSMA) and the European Telecommunications Standards Institute (ETSI) are developing technical standards regarding requirements and functional characteristics for smart secure platforms (SSPs) that represent flexible secure processing elements as a generalization of specialized secure elements used in wireless devices today for telecommunications, payment, identification, digital rights management and other authentication and authorization security functions. A smart secure platform (SSP) can provide security functions, such as authentication and/or authorization to access services or to perform administrative actions, for a wireless device for a variety of market segments. Different classes of SSP include an integrated SSP (iSSP) that can be included as part of a system-on-a-chip (SOC) platform, an embedded SSP (eSSP) that can be included on a system board of a device, and a removable SSP (rSSP) that can be housed in a device. The eSSP and rSSP can be considered generalizations of an eUICC and a UICC (also referred to as a SIM card) respectively. An SSP can include a primary platform that uses a lower layer operating system (OS) and a higher layer OS bundle that addresses a particular industry sector and provides functions specific to that industry sector. The SSP can be flexibly reused for different industry sectors by loading different higher layer OS bundles.

Different industry sectors can have different security certification requirements to perform various security functions and may use different security certificates issued by different certificate authorities (CAs). There does not exist a common, platform level CA that can address all industry sectors, and as such, the SSP can include multiple certificates from different CAs. The SSP can be programmed to support functions for different industry sectors, such as to access telecommunication services, to effect electronic payment processing, or to provide proof of identification, by loading an appropriate higher layer operating system (OS) bundle for execution by the SSP. The higher layer OS bundle can include a combination of OS code, applets, and metadata. The higher layer OS bundle can be uniquely identified by an OS bundle family identifier that includes one or more digits that identify the industry sector supported by the OS bundle. The SSP includes one or more certificates to use for functions associated with administrative operations or access to services for one or more industry sectors. The SSP can include one or more certificates issued by a telecommunications CA (e.g., managed by GSMA or the like) to use for telecommunications functions, and additionally include one or more certificates issued by a payment CA (e.g., managed by EMVCo or the like) to use for electronic payment processing. Depending on a management function required for execution by the SSP, an appropriate OS bundle and applicable certificate can be used to execute the management function. The SSP selects the applicable certificate based on an indication of which industry sector is associated with the OS bundle that seeks to execute the management function.

In representative embodiments, a user requests provisioning of a telecommunications OS bundle to the wireless device, e.g., to access cellular wireless services for a particular mobile network operator. Processing circuitry external to the SSP provides an indication of the telecommunications family bundle identifier to the SSP, which selects an applicable telecommunications certificate. Notably, certificates apply to a single OS bundle type. The SSP sends a request to a network entity, e.g., an image discovery service (IDS) that uses the same or a parallel telecommunications certificate for the provisioning process. Both the telecommunications certificate used by the SSP and the corresponding telecommunications certificate used by the IDS are issued by the same certificate authority (CA). The IDS verifies the request for provisioning of the OS bundle based on a signature provided in the request, the signature being generated by the SSP based at least in part on the telecommunications certificate selected by the SSP for the provisioning process. The SSP also verifies the downloaded OS bundle and associated metadata provided by the IDS during the provisioning process using the selected applicable telecommunications certificate.

An embedded Universal Integrated Circuit Card (eUICC), which stores electronic Subscriber Identity Modules (eSIMs) for a wireless device, represents a specific version of an SSP. Administrative operations, such as remote SIM provisioning (RSP) processes that provide for eSIM provisioning and updates, can require the wireless device to use appropriate operational modes when interfacing with a network entity according to an RSP process version supported by the network entity. As RSP processes evolve, different versions of RSP processes may be used by different network entities in the same wireless network or across different wireless networks. The eUICC can be required to support different RSP versions and adapt communication to a particular version of RSP process when communicating with a network entity, e.g., with a subscription manager data preparation (SM-DP) server or the like. The eUICC can include different certificates to use with each RSP process version. In some embodiments, the eUICC includes a first certificate issued by a first CA to support a first RSP process used by a first network entity, and a second certificate issued by a second CA to support a second RSP process used by a second network entity. Alternatively, the certificates can be issued by the same CA but can still be dedicated for use with different network entities that use different RSP processes.

A lower layer OS of the eUICC of a wireless device can flexibly connect to different network entities to effect administrative operations using an appropriate certificate based on either explicit or implicit detection, which can be realized by the eUICC or by a processing entity external to the eUICC. In some embodiments, a local profile assistant (LPA), or other comparable process executing on hardware of the wireless device external to the eUICC, determines an applicable certificate supported by a network entity with which a secure connection is established (or is to be established) to perform a management function, such as an RSP process. The LPA can send an explicit switching command to the eUICC to indicate to the eUICC to use a particular operational mode associated with an applicable certificate. The eUICC selects the applicable certificate for signing messages sent to the network entity and/or for verifying messages and content received from the network entity. The eUICC also switches to a particular operational mode (if required) based on the explicit command from the LPA, where the particular operational mode will allow for proper execution of the administrative operations in communication with the network entity. In some embodiments, the LPA determines the particular operational mode and/or the applicable certificate based on information obtained prior to initiating the RSP process. In some embodiments, the LPA determines the particular operational mode and/or the applicable certificate after initiating the RSP process, such as during a transport layer security (TLS) establishment between the LPA and the network entity. In some embodiments, the eUICC selects a particular operational mode to use and/or an applicable certificate based on a message relayed by the LPA from the network entity, where the message is signed with a security certificate by the network entity. The eUICC can determine the correct operational mode or security certificate to use implicitly from information in the message and/or accompanying the message without receipt of an explicit switching command from the LPA. In some embodiments, the eUICC uses a key identifier included in a signature associated with the message received from the network entity to determine the applicable certificate and/or operational mode for the RSP process. In some embodiments, the LPA determines that the network entity requires a particular operational mode or uses a particular version of a certificate prior to the eUICC receiving the message signature and adjusts any messages communicated by the eUICC to the LPA for forwarding to the network entity to align with determined particular operational mode or particular version of certificate required by the network entity.

These and other embodiments are discussed below with reference to FIGS. 1-6; however, those skilled in the art will readily appreciate that the detailed description given herein with respect to these figures is for explanatory purposes only and should not be construed as limiting.

FIG. 1A illustrates a block diagram of different components of an exemplary system 100 that is configured to implement the various techniques described herein, according to some embodiments. More specifically, FIG. 1A illustrates a high-level overview of the system 100, which, as shown, includes a user equipment (UE) 111, a group of base stations 112-1 to 112-n that are managed by different Mobile Network Operators (MNOs) 114, and a set of provisioning servers 116 that are in communication with the MNOs 114. The provisioning servers 116 may also be referred to as network entities that provide connections for downloading of software/firmware bundles for installation on secure elements of the UE 111 to allow the UE 111 to access cellular wireless network services. The UE 111 can represent a mobile computing device (e.g., an iPhone® or an iPad® by Apple®), the base stations 112-1 to 112-*n* can represent cellular wireless network entities including evolved NodeBs (eNBs) and/or next generation NodeBs (gNBs or gNB) that are configured to communicate with the UE 111, and the MNOs 114 can represent different wireless service providers that provide specific services (e.g., voice and data) to which the UE 111 can be subscribed.

As shown in FIG. 1A, the UE 111 can include processing circuitry, which can include one or more processors 104 and a memory 106, an embedded Universal Integrated Circuit Card (eUICC) 108, and a baseband component 110. In some embodiments, the UE 111 includes one or more physical Subscriber Identity Module (SIM) cards (not shown) in addition to or substituting for the eUICC. The components of the UE 111 work in conjunction to enable the UE 111 to provide useful features to a user of the UE 111, such as localized computing, location-based services, and Internet connectivity. The eUICC 108 can be configured to manage multiple electronic SIMs (eSIMs) for accessing different MNOs 114 through the base stations 112-1 to 112-*n*. For example, the eUICC 108 can be configured to store and manage one or more eSIMs for one or more MNOs 114 for different subscriptions to which the UE 111 is associated. To be able to access services provided by the MNOs, an eSIM can be provisioned to the eUICC 108. In some embodiments, the eUICC 108 obtains one or more eSIMs (or updates for one or more eSIMs) from one or more associated provisioning servers 116. It is noted that provisioning servers 116 can be maintained by a manufacturer of the UE 111, the MNOs 114, third party entities, and the like. Communication of eSIM data between a provisioning server 116 and the eUICC 108 (or between the provisioning server 116 and processing circuitry of the UE 111 external to the eUICC 108, e.g., the processor 104) can use a secure communication channel.

Figure 1B:
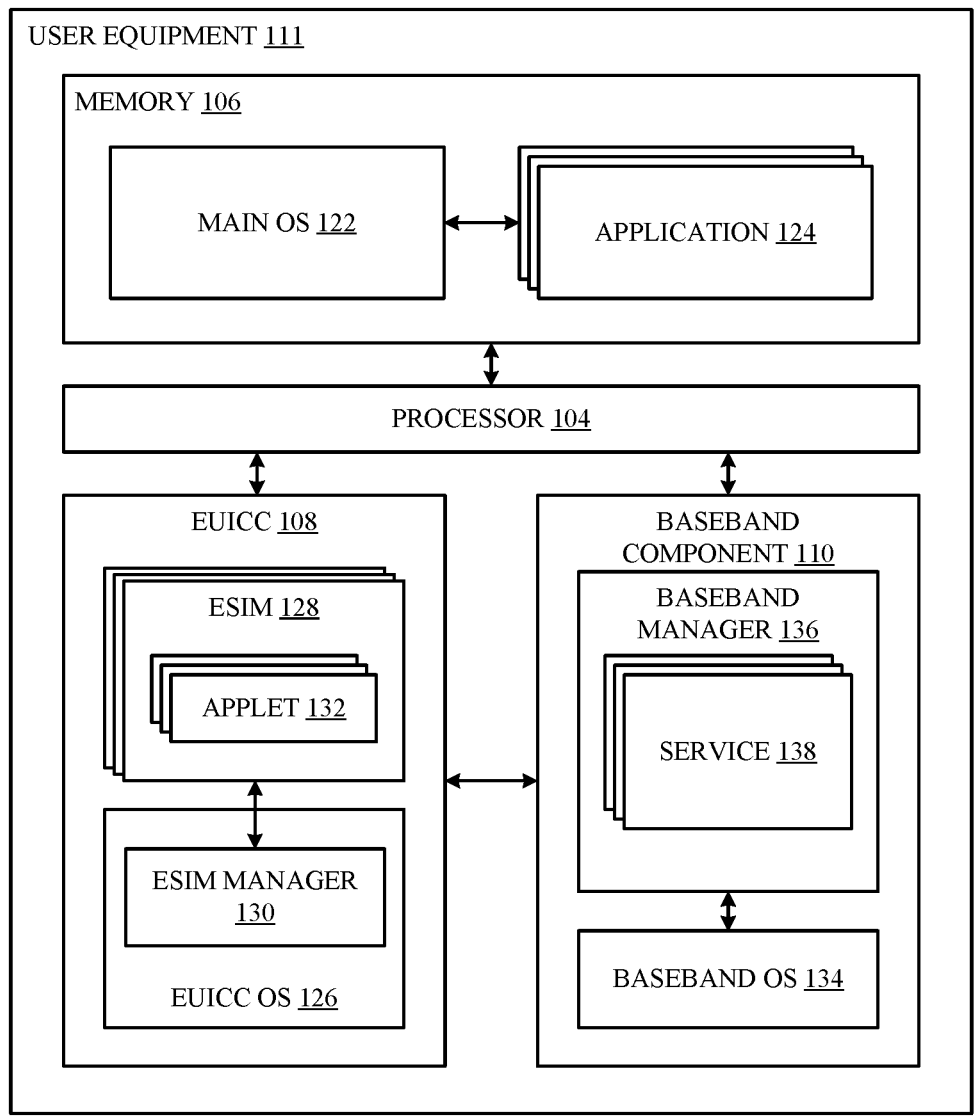
FIG. 1B illustrates a block diagram of a more detailed view of exemplary components of the system of FIG. 1A, according to some embodiments.

FIG. 1B illustrates a block diagram 120 of a more detailed view of particular components of the UE 111 of FIG. 1A, according to some embodiments. As shown in FIG. 1B, the processor 104, in conjunction with the memory 106, can implement a main operating system (OS) 122 that is configured to execute applications 124 (e.g., native OS applications and user applications). As also shown in FIG. 1B, the eUICC 108 can be configured to implement an eUICC OS 126 that is configured to manage the hardware resources of the eUICC 108 (e.g., a processor and a memory embedded in the eUICC 108). The eUICC OS 126 can also be configured to manage eSIMs 128 that are stored by the eUICC 108, e.g., by enabling, disabling, modifying, or otherwise performing management of the eSIMs 128 within the eUICC 108 and providing the baseband component 110 with access to the eSIMs 128 to provide access to wireless services for the UE 111. The eUICC 108 OS can include an eSIM manager 130, which can perform management functions for various eSIMs 128. According to the illustration shown in FIG. 1B, each eSIM 128 can include a number of applets 132 that define the manner in which the eSIM 128 operates. For example, one or more of the applets 132, when implemented by the baseband component 110 and the eUICC 108, can be configured to enable the UE 111 to communicate with an MNO 114 and provide useful features (e.g., phone calls and internet) to a user of the UE 111.

As also shown in FIG. 1B, the baseband component 110 of the UE 111 can include a baseband OS 134 that is configured to manage hardware resources of the baseband component 110 (e.g., a processor, a memory, different radio components, etc.). According to some embodiments, the baseband component 110 can implement a baseband manager 136 that is configured to interface with the eUICC 108 to establish a secure channel with a provisioning server 116 and obtaining information (such as eSIM data) from the provisioning server 116 for purposes of managing eSIMs 128. The baseband manager 136 can be configured to implement services 138, which represents a collection of software modules that are instantiated by way of the various applets 132 of enabled eSIMs 128 that are included in the eUICC 108. For example, services 138 can be configured to manage different connections between the UE 111 and MNOs 114 according to the different eSIMs 128 that are enabled within the eUICC 108.

Figure 2A:
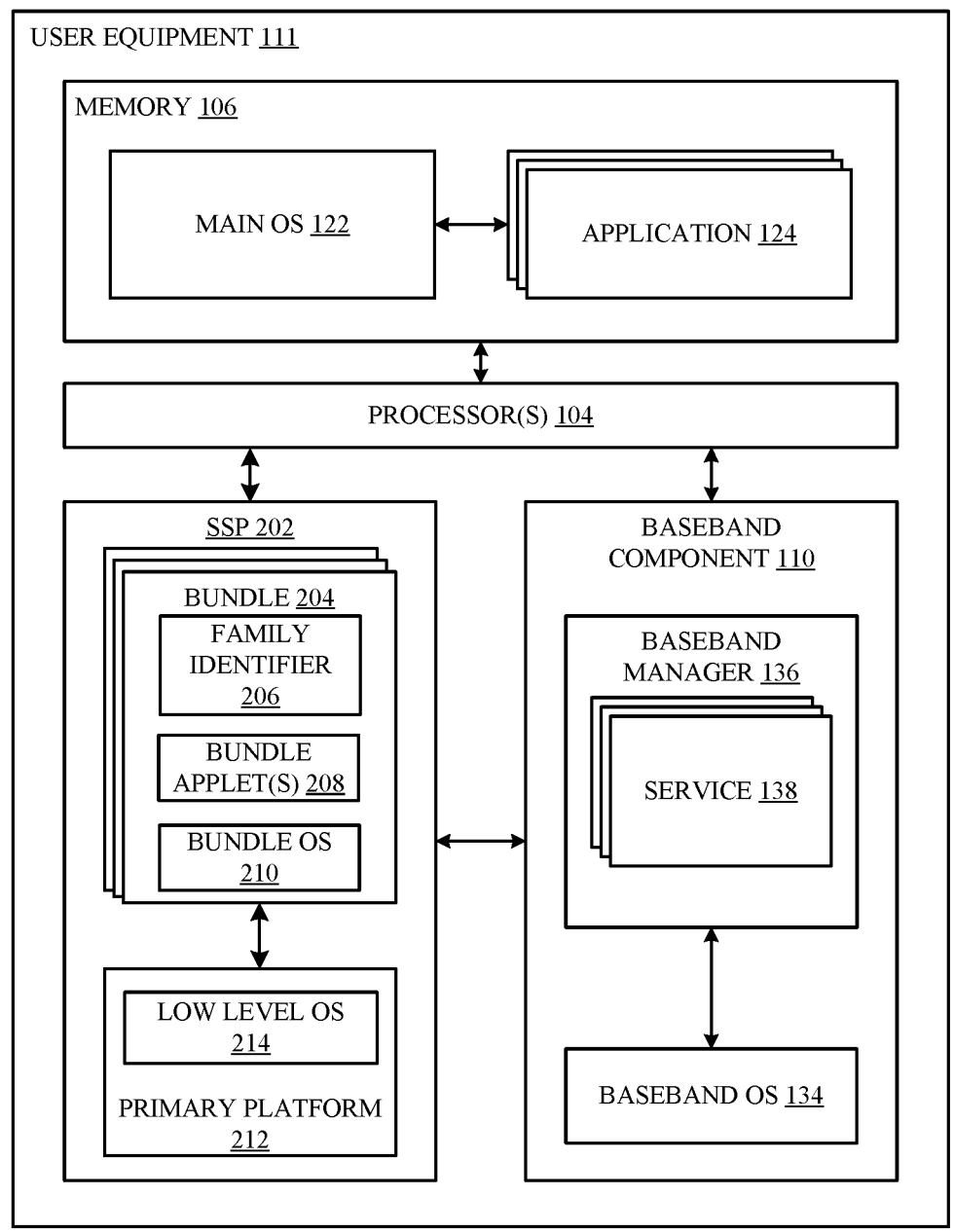
FIG. 2A illustrates a block diagram of a more detailed view of alternative exemplary components of the system of FIG. 1A, according to some embodiments.

FIG. 2A illustrates a block diagram 200 of a more detailed view of alternative exemplary components of the system 100 of FIG. 1A, in which the eUICC 108 of the UE 111 is replaced with a more generalized smart secure platform (SSP) 202. Smart secure platforms 202 are currently undergoing standardization efforts in both the GSMA and ETSI standards bodies to define their functional requirements and operational characteristics to provide secure processing for various functions in a wireless device. An SSP 202 can provide security functions, such as authentication and/or authorization to access services or to perform administrative actions, for a wireless device for a variety of market segments, including telecommunications as performed today by an eUICC 108 (or a removable UICC) or electronic payments as performed today by a secure processor (also referred to as a secure element or a secure enclave processor), such as used for Apple Pay® or similar electronic payment services. Different classes of SSP 202 include an integrated SSP (iSSP) that can be included as part of a system-on-a-chip (SOC) platform, an embedded SSP (eSSP) that can be included on a system board of a device, and a removable SSP (rSSP) that can be housed in a device. The eSSP and rSSP can be considered generalizations of the eUICC 108 and the removable UICC (also referred to as a SIM card) respectively. The SSP 202 can include a primary platform 212 that uses a lower layer (low level) operating system (OS) 214 and an activated (loaded) higher layer bundle 204 that addresses a particular industry sector (market segment) and provides functions specific to allow the wireless device to perform authorization/authentication functions to access services or perform administrative actions for that industry sector. The SSP 202 can be flexibly reused for different industry sectors by loading different higher layer bundles 204. Representative industry sectors in discussion include telecommunications, payment, identity, digital rights management, and Internet of Things (IoT). Each higher layer bundle 204 can include its own identifier 206, applet(s) 208, and OS 210. The primary platform 212 can maintain a set of platform credentials (also referred to as certificates) 216 that support the higher layer bundles 204 to use for performing their associated security functions.

A higher layer bundle 204 can be categorized based on a unique bundle family identifier 206 that can include one or more digits to indicate to which industry sector the higher layer bundle 204 applies and additional digits to further define the unique higher layer bundle 204. A higher layer bundle 204 can include one or more bundle applets 208 and an associated bundle OS 210 that can execute on hardware of the SSP 202 to provide the security functions offered by the bundle 204 and required by the applicable industry sector. The SSP 202 can communicate with external processing circuitry including the one or more main processors 104 of the UE 111 and/or the baseband component 110 to interact with a user of the UE 111, e.g., to receive indications of requested functions that can require use of the SSP 202, and to establish communication channels for access to services and/or to perform administrative functions. Different industry sectors can have different certification requirements for both performance of various functions and for security. Current secure elements, such as the eUICC 108, can use a single certificate for all administrative and security functions, where the single certificate is used by a telecommunications certificate authority (CA). As there is not currently existing, nor is there anticipated, a single central entity for managing certifications for all of the various industry sectors that are expected to use the SSP 202, no single certificate can be issued to apply to all of the industry sectors. As such, the SSP 202 can be required to use various certificates 216 provided by various certificate authorities as applicable to the function for which the SSP 202 is being used based on the higher layer bundle 204 that is active in the SSP 202. As the higher layer bundles 204 can be identified by their bundle identifier 206, the SSP 202 can access the appropriate certificate 216 to perform the security and administrative functions based on the bundle identifier 206.

Figure 2B:
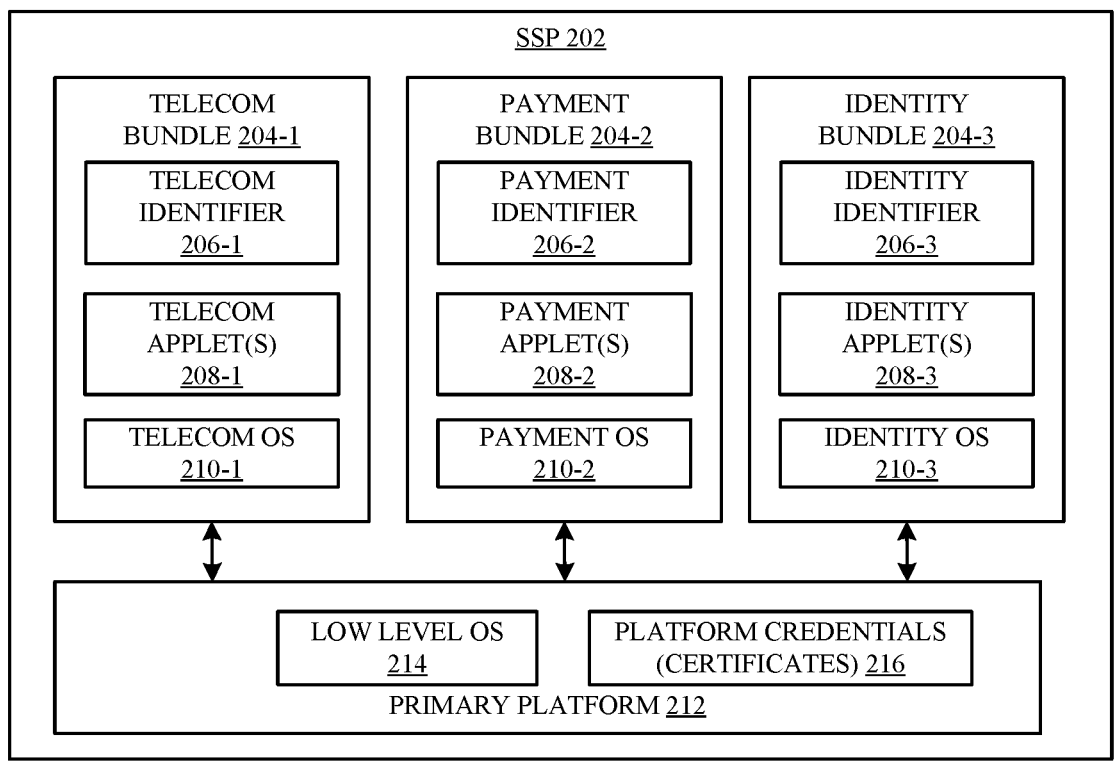
FIG. 2B illustrates a block diagram of exemplary components of a secure smart platform, according to some embodiments.

FIG. 2B illustrates a diagram 220 of an exemplary SSP 202 that includes multiple higher layer bundles 204 that each support a distinct industry sector. For example, the SSP 202 includes a telecom higher layer bundle 204-1, which includes its own telecom (bundle family) identifier 206-1, telecom applet(s) 208-1, and an associated higher layer telecom OS 210-1. Similarly, the SSP 202 includes a corresponding payment higher layer bundle 204-2, which includes its own payment (bundle family) identifier 206-2, payment applet(s) 208-2, and an associated higher layer payment OS 210-2, and a corresponding identity higher layer bundle 204-3, which includes its own identity (bundle family) identifier 206-3, identity applet(s) 208-3, and an associated higher layer identity OS 210-3. By loading the appropriate higher layer bundle 204, the SSP 202 can serve different functions for different industry sectors.

Figure 2C:
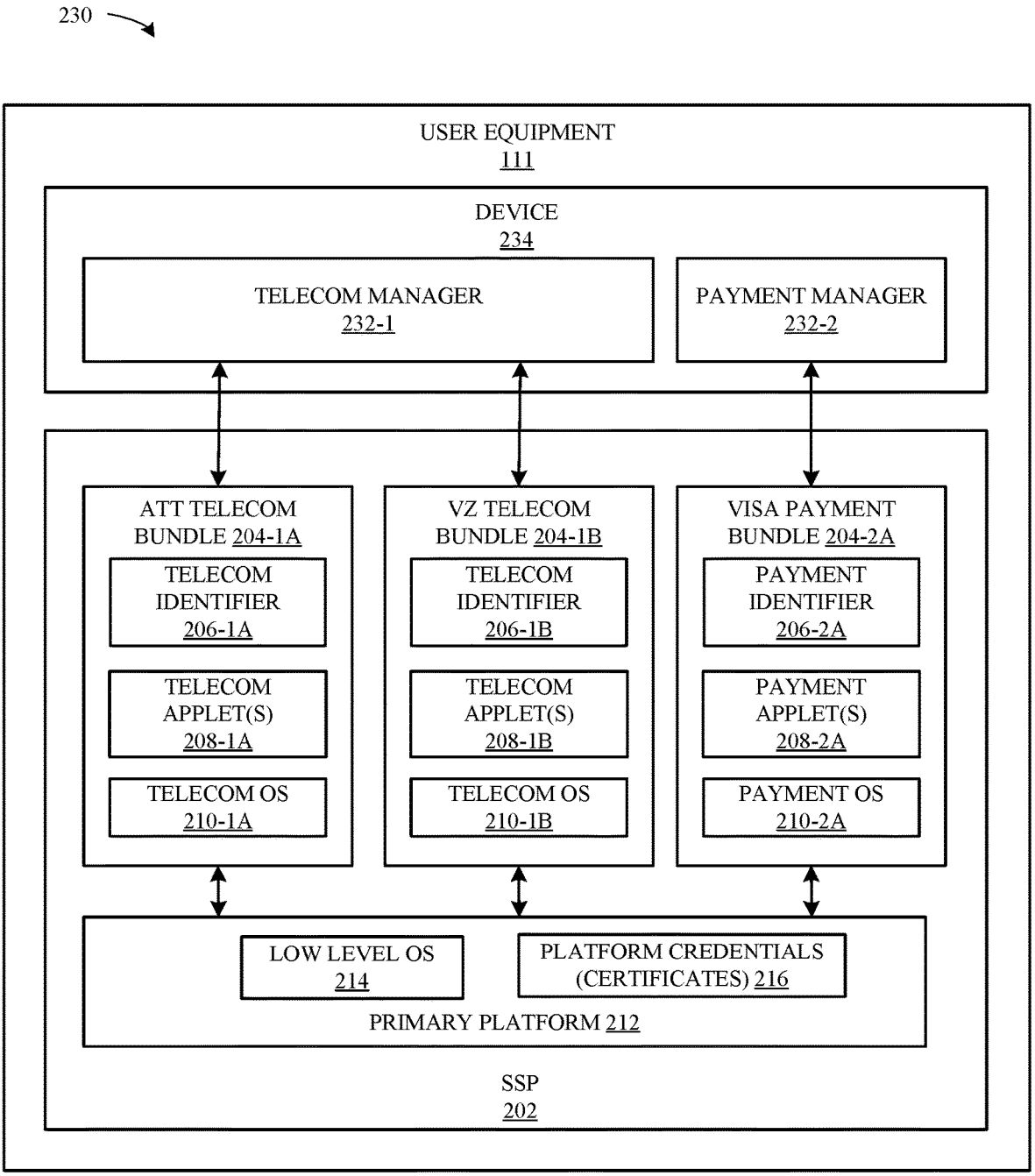
FIG. 2C illustrates a block diagram of exemplary components of a user equipment (UE) that includes a secure smart platform, according to some embodiments.

FIG. 2C illustrates a block diagram 230 of exemplary components of a UE 111 that includes an SSP 202 that includes multiple higher layer bundles 204. As shown, the UE 111 can include multiple higher layer bundles 204 for a given industry sector, such as an AT&T telecommunication higher layer bundle 204-1A, which includes its own telecom bundle identifier 206-1A, telecom applets 208-1A, and telecom OS 210-1A, and a Verizon telecommunication higher layer bundle 204-1B, which includes its own telecom bundle identifier 206-1B, telecom applets 208-1B, and telecom OS 210-1B. Operational characteristics for performing various security and/or administrative functions can vary for different telecommunications service providers. In some embodiments, the same certificate 216 can be used by either telecommunication bundle 204-1A/B, while in some embodiments, each telecommunication bundle 204-1A/B can be associated with a distinct certificate 216. When loading a higher layer bundle 204 to provide specific functions for the UE 111, the SSP 202 can also locate applicable certificates 216 to use with the loaded higher layer bundle 204. The SSP 202 can also include other higher layer bundles 204 in addition to one or more telecommunication bundles 204, such as the Visa payment bundle 204-2A, which includes its own payment bundle identifier 206-2A, payment applets 208-2A, and payment OS 210-2A. A payment bundle 204, such as the Visa payment bundle 204-2A, can use a different certificate 216 provided by a different certificate authority that the certificate(s) 216 used by the telecommunication bundles 204. Processing circuitry external to the SSP 202 can include a telecom manager 232-1 that interfaces with the SSP 202 to provide telecom functions for the UE 111 and a payment manager 232-2 that interfaces with the SSP 202 to provide electronic payment functions for the UE 111. In some embodiments, processing circuitry of the UE 111 external to the SSP 202 can also be referred to as a device 234, while the combination of the SSP 202 and the device 234 can be referred to as the UE 111.

Figure 3A:
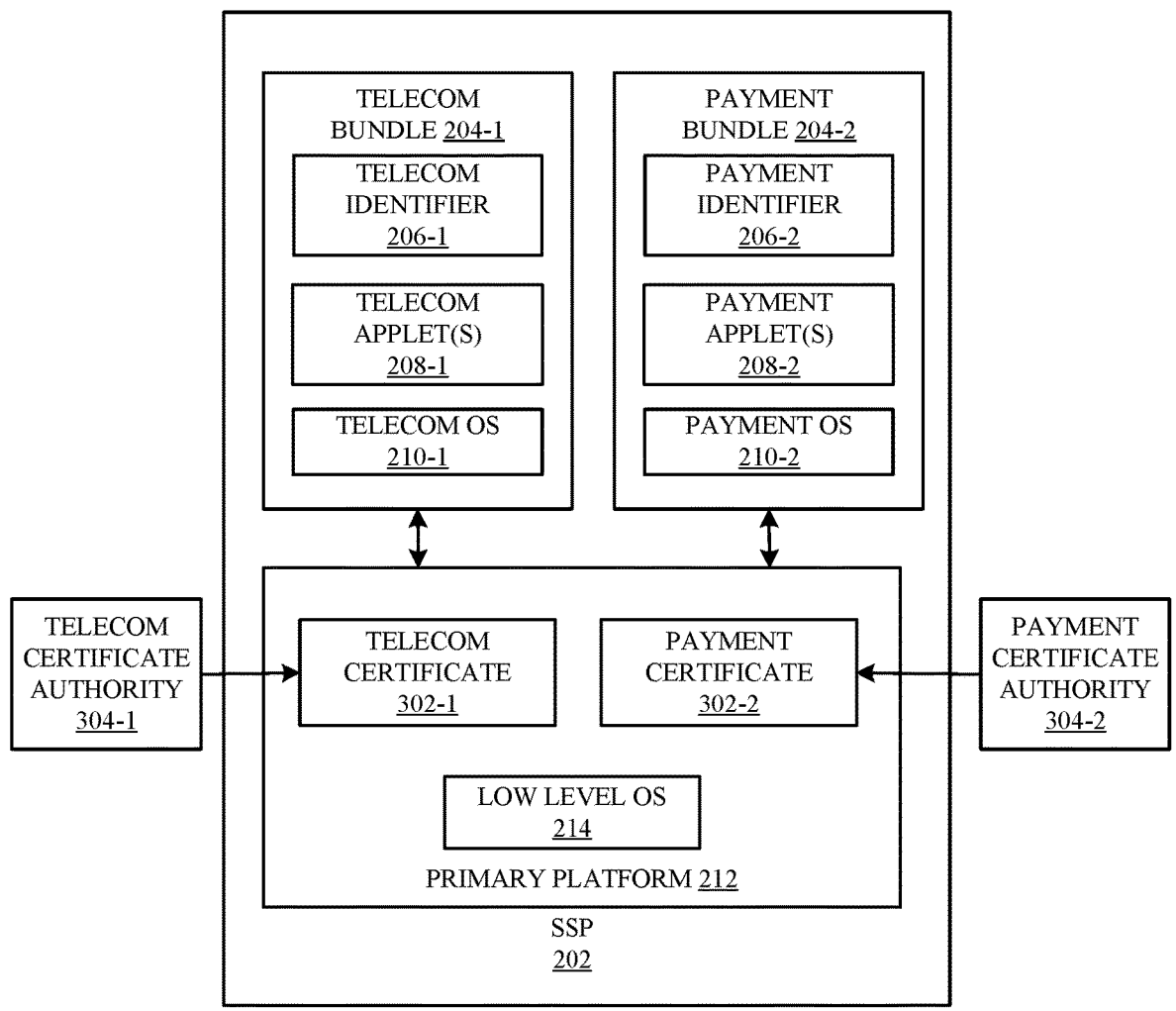
FIG. 3A illustrates a block diagram of the smart secure platform of FIG. 2B and associated certificate authorities, according to some embodiments.

FIG. 3A illustrates a block diagram 300 of the smart secure platform 202 of FIG. 2B and associated certificate authorities 304. A telecom certificate 302-1, used for authorization, authentication, and/or verification for telecommunication functions provided by the telecom bundle 204-1 can be issued by a telecom certificate authority 304-1. A payment certificate 302-2, used for authorization, authentication, and/or verification for electronic payment functions provided by the payment bundle 204-2 can be issued by a separate telecom certificate authority 304-2. Both the telecom certificate 302-1 and the payment certificate can be co-resident in the primary platform 212 of the SSP 202. Upon invocation of a telecommunication function or a payment function, the SSP 202 can load the applicable higher layer bundle 204 (if not already loaded) and access the applicable certificate 302 in order to execute a requested function.

Figure 3B:
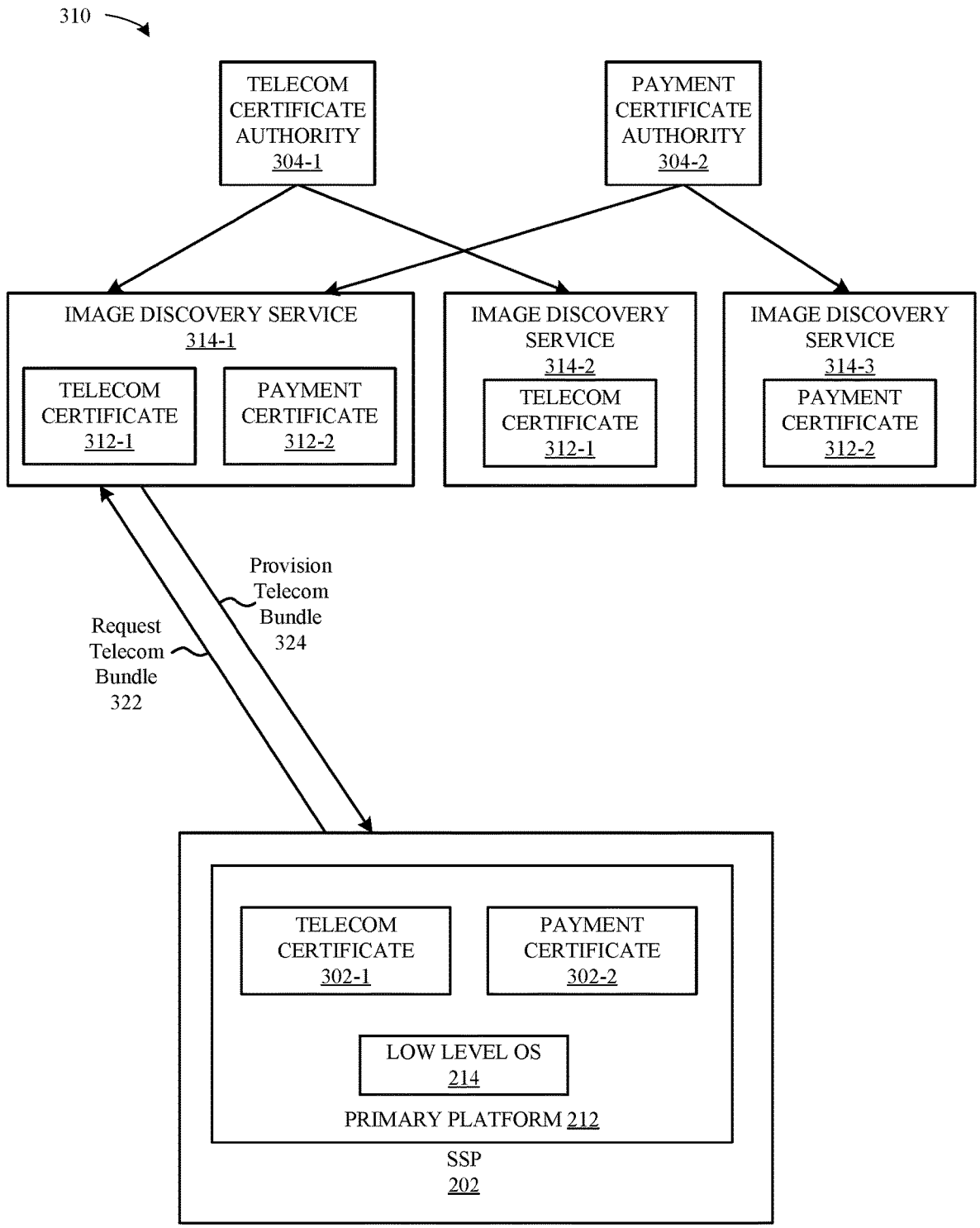
FIG. 3B illustrates a block diagram of the smart secure platform of FIG. 2B in communication with a network entity to obtain an operating system (OS) bundle, according to some embodiments.

FIG. 3B illustrates a block diagram 310 of the SSP 202 of FIG. 2B in communication with a network entity to obtain a telecom operating system (OS) bundle as an example of a telecom management function. A user of the UE 111 (or the device 234 of the UE 111) can request provisioning of a telecom OS bundle to the UE 111, including in some embodiments providing to the SSP 202 an indication of a telecom identifier 206-1 for the telecom OS bundle. The primary platform 212 of the SSP 202 can select the telecom certificate 302-1 to use for authentication, authorization, and/or verification to perform the provisioning of the telecom OS bundle to the UE 111. In some configurations, the SSP 202 can link different certificates 302 with different high layer bundle families based on the family identifier 206. A request 322 for a telecom OS bundle is presented by the SSP 202 (via a secure communication channel established through the baseband component 110) to a network entity, e.g., an image discovery service 314-1 that supports telecom provisioning. The image discovery service 314-1 can represent a network provisioning server 116 as illustrated in FIG. 1A or an equivalent, such as a subscription manager data preparation (SM-DP) server. The request 322 can be authenticated by the image discovery service 314-1 based on both the family identifier 206 (e.g., a telecom identifier 206-1) and a signature (or other accompanying content or metadata with the request) that is based on the telecom certificate 302-1 stored by the primary platform 212 of the SSP 202. The image discovery service 314-1 can use its own telecom certificate 312-1 to verify the validity of the request 322. In some embodiments, the telecom certificate 302-1 maintained by the SSP 202 and the telecom certificate 312-1 maintained by the image discovery service 314-1 can be provided by the same telecom certificate authority 304-1. In some embodiments, the telecom certificate 312-1 of the image discovery service 314-1 and the telecom certificate 302-1 of the SSP 202 can be provided by different telecom certificate authorities that belong to a set of trusted certificate authorities for the telecom industry sector. The requested telecom OS bundle can be provisioned 324 to the SSP 202 of the UE 111 after the request 322 is authenticated and can be signed using the corresponding telecom certificate 312-1 of the image discovery service 314-1. The SSP 202 of the UE 111 can verify the telecom OS bundle (and accompanying metadata) received from the image discovery service 314-1 using the telecom certificate 302-1. The image discovery service 314-1 can include multiple certificates 312, e.g., both telecom certificates 312-1 and payment certificates 312-2, in some embodiments. A telecom certificate authority 304-1 can provide telecom certificates 312-1 to different image discovery services 314-1, 314-2, while a payment certificate authority 304-2 can provide payment certificates 312-1, 312-2, to different image discovery services 314-2, 314-3.

Figure 4:
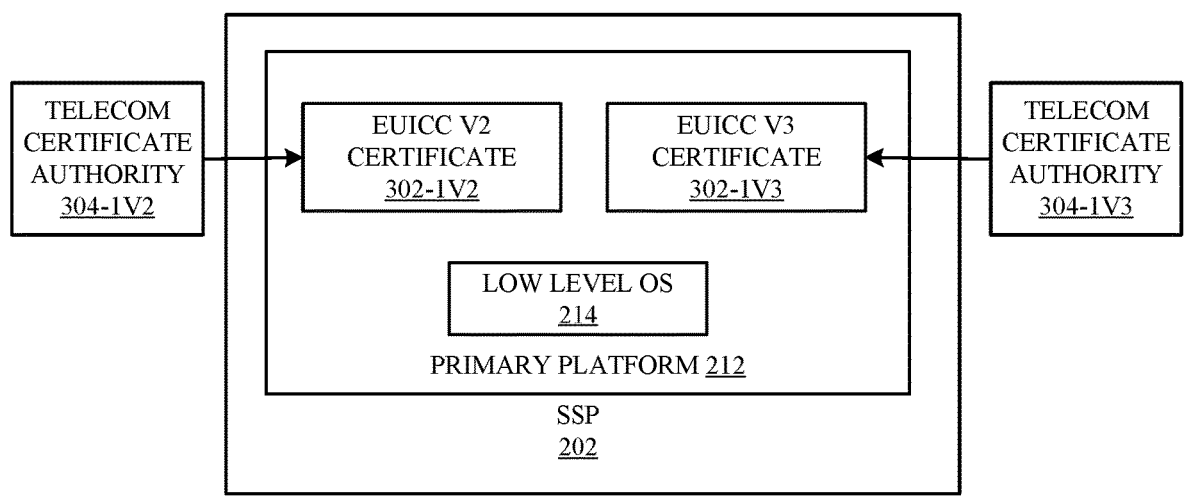
FIG. 4 illustrates a block diagram of an embedded Universal Integrated Circuit Card (eUICC) of the UE of FIG. 1B and associated certificate authorities, according to some embodiments.

FIG. 4 illustrates a block diagram 400 of an eUICC 108 of the UE 111 with multiple certificates 302 to use for communication with different network entities that use different certificate authorities (CAs) 304, which may be established based on different versions of administrative processes, such as different versions of remote SIM provisioning (RSP) processes. The RSP processes can require the UE 111 to use appropriate operational modes when interfacing with a network entity according to an RSP process version supported by the network entity. The eUICC 108 can include different certificates 302 provided by different CAs, such as a first certificate 302-1V2 issued by a first telecom CA 304-1V2 to support a first (version 2 or v2) RSP process used by a first network entity, and a second certificate 302-1V3 issued by a second telecom CA 304-1V3 to support a second (version 3 or v3) RSP process used by a second network entity. Alternatively, the certificates 302 can be issued by the same CA 304 but can still be dedicated for use with different network entities that use different RSP processes, e.g., where a network entity requires use of a particular version of RSP process in conjunction with a particular telecom certificate 302. In some embodiments, different versions of RSP processes can use different steps, different public key infrastructure (PKI) hierarchies, and/or distinct certificates 302 issued by the same CA 304, or different certificates issued by different CAs 304. In some embodiments, a later (e.g., version 3) RSP process can use a different set of features than an earlier (e.g., version 3) RSP process and can be not completely backward compatible, such as due to limitations in version 2 extensions for forward compatibility. Functions and behaviors of the RSP processes can vary to complete various administrative actions. The eUICC 108 of the UE 111 can adapt to use different processes based on assistance in identification of the applicable RSP process (and therefore use of the correct certificate) either explicitly or implicitly as further described herein.

Figure 5A:
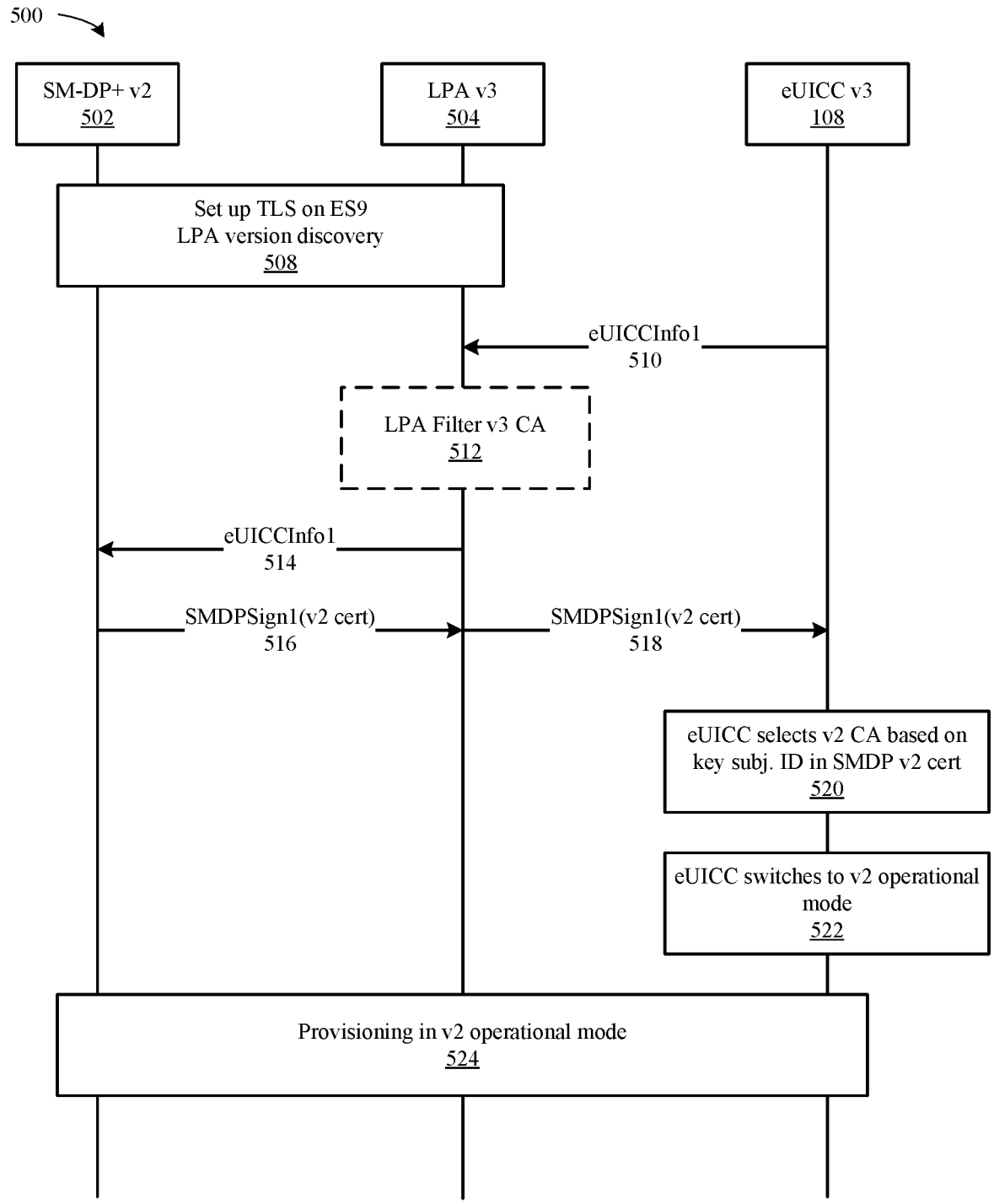
FIGS. 5A, 5B, and 5C illustrate flow diagrams of exemplary message exchanges and actions by components of the UE of FIG. 1B to trigger operational mode switching for a remote SIM provisioning (RSP) process, according to some embodiments.

FIG. 5A illustrates a flow diagram 500 of an exemplary message exchange and actions by components of the UE 111 of FIG. 1B to trigger operational mode switching for a remote SIM provisioning (RSP) process implicitly. A low level (lower layer) OS 214 of the eUICC 108 of the UE 111 can flexibly connect to different network entities to effect administrative operations using an appropriate certificate 302 based on either explicit or implicit detection, which can be realized by the eUICC 108 or by a processing entity external to the eUICC 108. In some embodiments, a local profile assistant (LPA) 504, or other comparable process executing on hardware of the wireless device external to an eUICC 108 of the UE 111, which normally operates in a version 3 mode, determines an applicable certificate 302 supported by a network entity, e.g., the SM-DP+ 502, which operates in a version 2 mode, with which a secure connection is established (or is to be established) to perform a management function, such as an RSP process. At 508, the LPA 504 establishes a transport level security (TLS) via an ES9 interface with the SM-DP+ 502, and during the TLS establishment, the LPA 504 discovers an applicable operational mode (version) for interacting with the SM-DP+ 502. At 510, the eUICC 108 can provide information, e.g., eUICCInfo1, as part of establishing a secure connection with the SM-DP+ for implementing an RSP process. In some embodiments, the eUICC 108 can be unaware of the particular operational mode (version) for the SM-DP+ when providing eUICCinfo1. In some embodiments, the LPA 504, which can be aware of the SM-DP+ 502 requiring the version 2 operational mode, can adjust communication, at 512, between the eUICC 108 and the SM-DP+ 502. For example, formats or accompanying meta data of the information eUICCInfo1 provided at 510 by the eUICC 108 (in accordance with a version 3 operational mode) can be adjusted (filtered) by the LPA 504 at 512 (to correspond to a version 2 operational mode) and then forwarding to the SM-DP+ 502 at 514. In response to receipt of the eUICCInfo1, the SM-DP+ 502, at 516, communicates a message SMDPSign1(v2 cert) that is signed (or is accompanied by metadata that is signed) with a version 2 certificate 302. At 518, the LPA 504 relays the message SMDPSign1(v2 cert) to the eUICC 108. At 520, the eUICC 108 selects an applicable version 2 (v2) certificate 302 for authentication, authorization, and/or verification for further communication with the SM-DP+ 502. The eUICC 108, in some embodiments, recognizes information in the signature of the message (or its accompanying metadata) to determine that the SM-DP+ 502 requires a version 2 operational mode that uses a version 2 certificate 302. At 522, the eUICC 108 switches its own operational mode for the remainder of the RSP process to use an applicable version 2 (v2) operational mode. Subsequently, at 524, the RSP process continues between the eUICC 108 and the SM-DP+ 502 (directly or via the LPA 504) in the version 2 operational mode.

Figure 5B:
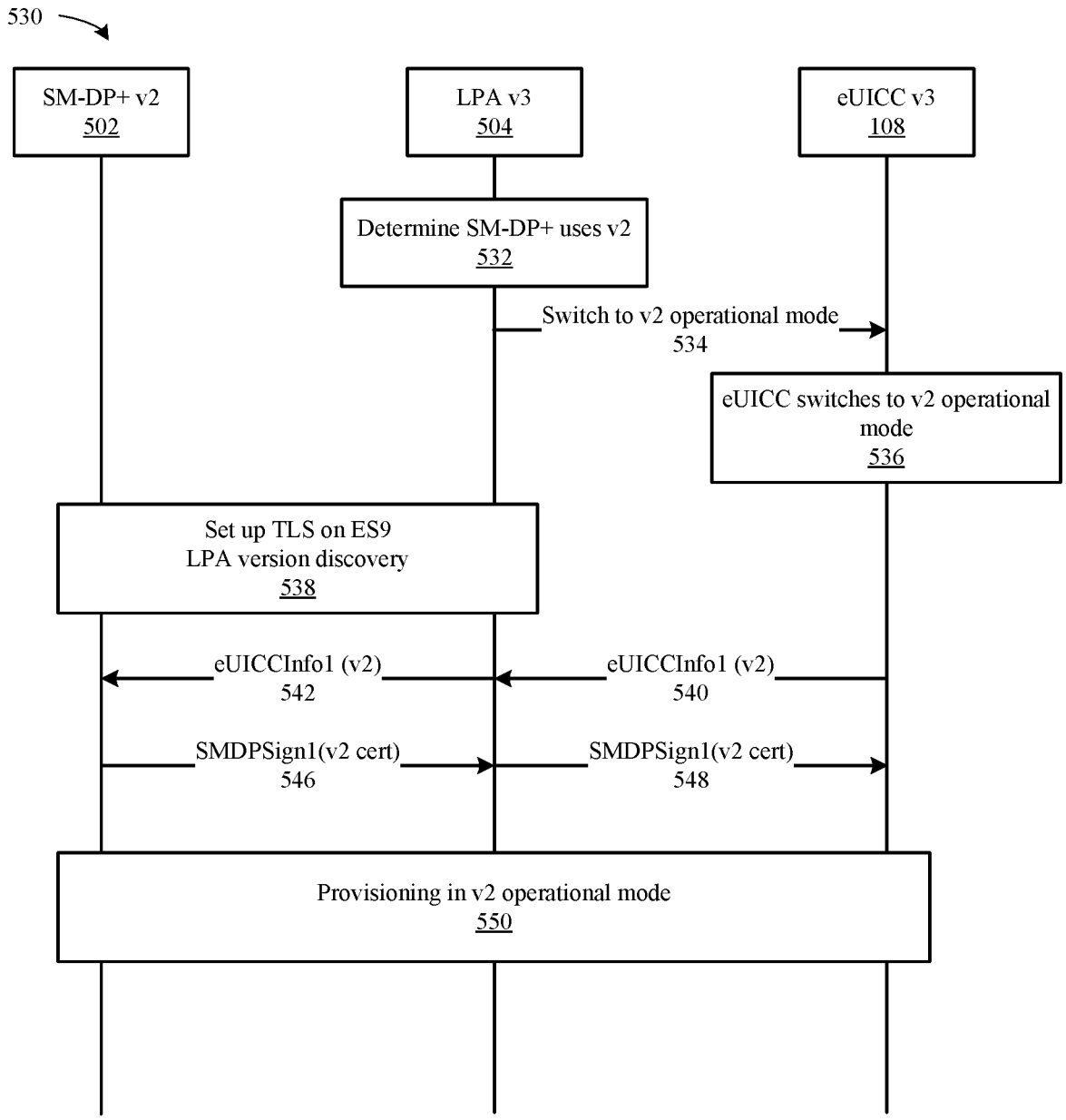

FIG. 5B illustrates a flow diagram 530 of another exemplary message exchange and actions by components of the UE 111 of FIG. 1B to trigger operational mode switching for a remote SIM provisioning (RSP) process explicitly. At 532, the LPA 504 of the UE 111 determines that the SM-DP+ 502 operates in accordance with (or requires for the RSP process) a version 2 (v2) operational mode. Determination by the LPA 504 can be based on information obtained from the SM-DP+ 502 prior to the start of the RSP process or by other out-of-band means, e.g., based on previous communication with the same SM-DP+ 502. The LPA 504, at 534, can send an explicit operational mode switching command to the eUICC 108 to change (if not already operating in) to use an applicable version 2 (v2) operational mode for the RSP process with the SM-DP+ 502. At 536, the eUICC 108 switches to the version 2 (v2) operational mode. Subsequently, at 538, the LPA 504 establishes TLS via an ES9 interface with the SM-DP+ 502. Optionally, at 538, the LPA 504 can reconfirm the operational mode version required for the SM-DP+ 502. At 540, the eUICC 108 provides a message, e.g., eUICCInfo1, that is formatted or otherwise in accordance with the version 2 (v2) operational mode to the LPA 504, which forwards the message to the SM-DP+ 502 at 542. Responsive to receipt of the message from the eUICC 108, the SM-DP+, at 546, responds with a message, SMDPSign1(v2 cert) that is signed with a version 2 certificate 302, which is forwarded to the eUICC 108 at 548. The eUICC 108 can use the appropriate version 2 certificate 302 for verification of the message from the SM-DP+. At 550, the RSP process continues using the version 2 operational mode.

Figure 5C:
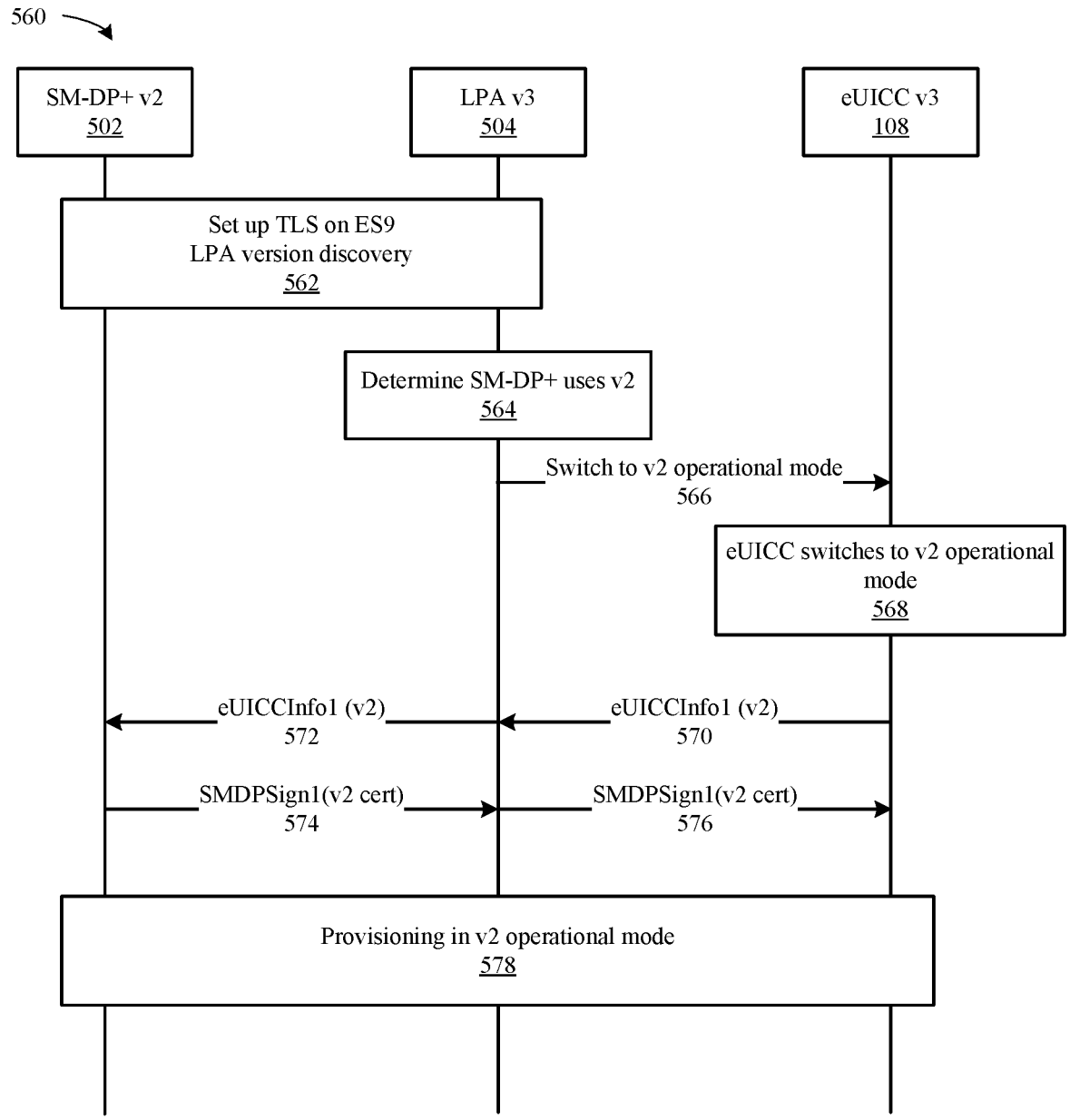

FIG. 5C illustrates a flow diagram 560 of another exemplary message exchange and actions by components of the UE 111 of FIG. 1B to trigger operational mode switching for a remote SIM provisioning (RSP) process explicitly. Unlike FIG. 5B, where the LPA 504 determines the operational mode to use before initiating contact with the SM-DP+ 502, at 562, the LPA 504 of the UE 111 determines that the SM-DP+ 502 operates in accordance with (or requires for the RSP process) a version 2 (v2) operational mode as part of establishing the TLS via the ES9 interface and/or based on information obtained from the SM-DP+ as part of the process at 562. At 564, the LPA 504 determines that the SM-DP+ 502 requires a version 2 operational mode and, at 566, the LPA 504 sends an explicit operational mode switching command to the eUICC 108 to change (if not already operating in) to use an applicable version 2 (v2) operational mode for the RSP process with the SM-DP+ 502. At 568, the eUICC 108 switches to the version 2 (v2) operational mode. At 570, the eUICC 108 provides a message, e.g., eUICCInfo1, that is formatted or otherwise in accordance with the version 2 (v2) operational mode to the LPA 504, which forwards the message to the SM-DP+ 502 at 572. Responsive to receipt of the message from the eUICC 108, the SM-DP+, at 574, responds with a message, SMDPSign1(v2 cert) that is signed with a version 2 certificate 302, which is forwarded to the eUICC 108 at 576. The eUICC 108 can use the appropriate version 2 certificate 302 for verification of the message from the SM-DP+. At 578, the RSP process continues using the version 2 operational mode.

Figure 6A:
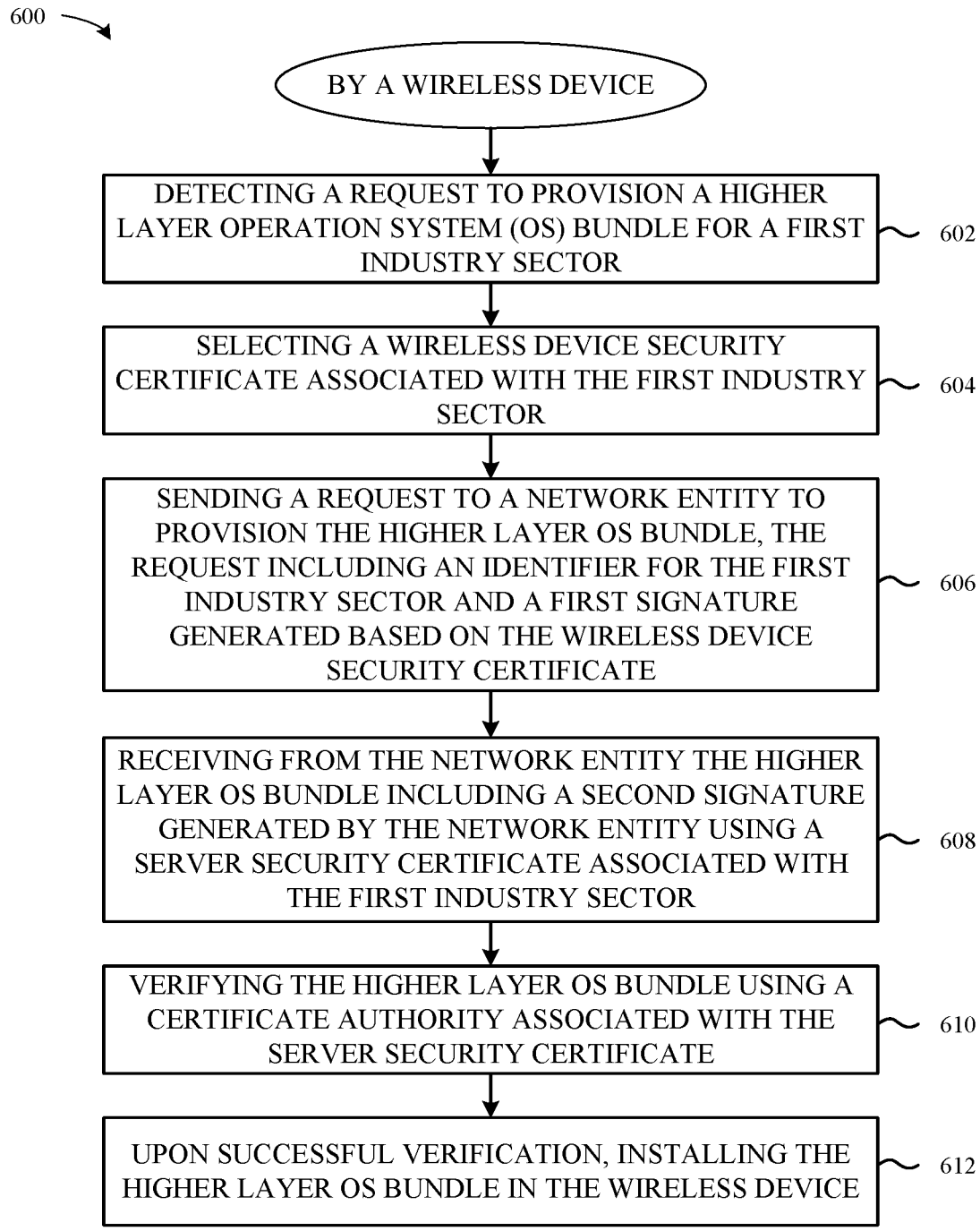
FIG. 6A illustrates an exemplary method for switching between multiple security certificates, according to some embodiments.

FIG. 6A illustrates a flow chart 600 of an exemplary method for switching between multiple security certificates by a wireless device to support different functions for different industry sectors. At 602, the wireless device detects a request to provision a higher layer operating system (OS) bundle for a first industry sector. At 604, the wireless device selects a wireless device security certificate associated with the first industry sector. At 606, the wireless device sends a request to a network entity to provision the higher layer OS bundle, the request including an identifier for the first industry sector and a first signature generated based on the wireless device security certificate. At 608, the wireless device receives, from the network entity, the higher layer OS bundle including a second signature generated by the network entity using a server security certificate associated with the first industry sector. At 610, the wireless device verifies the higher layer OS bundle using a certificate authority associated with the server security certificate. At 612, the wireless device, upon successful verification, installs the higher layer OS bundle in the wireless device.

Figure 6B:
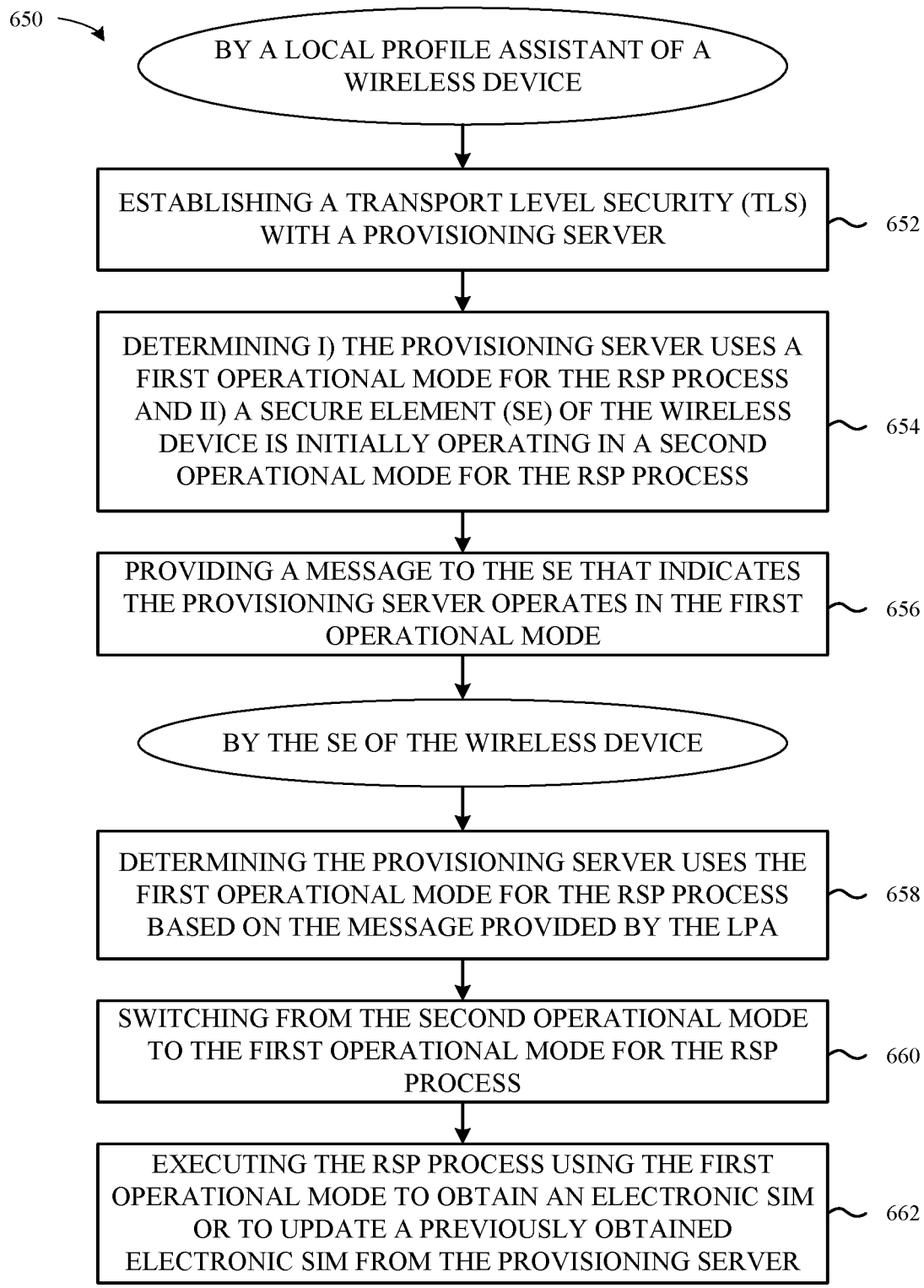
FIG. 6B illustrates an exemplary method for triggering operational mode switching during an RSP process, according to some embodiments.

FIG. 6B illustrates a flow chart 650 of an exemplary method of triggering operational mode switching during a remote subscriber identity module (SIM) provisioning (RSP) process. At 652, a local profile assistant (LPA) of a wireless device establishes a transport level security (TLS) with a provisioning server. A 654, the LPA of the wireless device determines i) the provisioning server uses a first operational mode for the RSP process and ii) a secure element (SE) of the wireless device is initially operating in a second operational mode for the RSP process. At 656, the LPA of the wireless device provides a message to the SE that indicates the provisioning server operates in the first operational mode. At 658, the SE of the wireless device determines the provisioning server uses the first operational mode for the RSP process based on the message provided by the LPA. At 660, the SE of the wireless device switches from the second operational mode to the first operational mode for the RSP process. At 662, the SE of the wireless device executes the RSP process using the first operational mode to obtain an electronic SIM or to update a previously obtained electronic SIM from the provisioning server.

EXEMPLARY EMBODIMENTS

In some embodiments, a method for switching between multiple security certificates by a wireless device to support different functions for different industry sectors includes a wireless device: (i) detecting a request to provision a higher layer operating system (OS) bundle for a first industry sector; (ii) selecting a wireless device security certificate associated with the first industry sector; (iii) sending a request to a network entity to provision the higher layer OS bundle, the request including an identifier for the first industry sector and a first signature generated based on the wireless device security certificate; (iv) receiving from the network entity the higher layer OS bundle including a second signature generated by the network entity using a server security certificate associated with the first industry sector; (v) verifying the higher layer OS bundle using a certificate authority associated with the server security certificate; and (vi) upon successful verification, installing the higher layer OS bundle in the wireless device.

In some embodiments, the first industry sector corresponds to one of: a telecommunications industry sector, an electronics payment industry sector, a digital identification industry sector, a digital rights management industry sector, or an Internet of Things (IoT) industry sector. In some embodiments, the first industry sector corresponds to the telecommunications industry sector and the higher layer OS bundle includes credentials for access to a cellular wireless service. In some embodiments, the network entity includes a provisioning server. In some embodiments, the wireless device security certificate and the server security certificate are issued by the same certificate authority. In some embodiments, the wireless device security certificate and the server security certificate are issued by distinct certificate authorities that each serve a telecommunications industry sector. In some embodiments, the wireless device includes multiple device security certificates, each device security certificate corresponding to a particular industry sector. In some embodiments, the wireless device includes multiple device security certificates, at least two device security certificates corresponding to different industry sectors.

In some embodiments, a method of triggering operational mode switching during a remote subscriber identity module (SIM) provisioning (RSP) process includes a local profile assistant (LPA) of a wireless device: (i) establishing a transport level security (TLS) with a provisioning server; (ii) determining (a) the provisioning server uses a first operational mode for the RSP process and (b) a secure element (SE) of the wireless device is initially operating in a second operational mode for the RSP process; and (iii) providing a message to the SE that indicates the provisioning server operates in the first operational mode; and the SE of the wireless device: (iv) determining the provisioning server uses the first operational mode for the RSP process based on the message provided by the LPA; (v) switching from the second operational mode to the first operational mode for the RSP process; and (vi) executing the RSP process using the first operational mode to obtain an electronic SIM or to update a previously obtain electronic SIM from the provisioning server.

In some embodiments, the message from the LPA includes a message forwarded from the provisioning server, the message including a signature that uses a server security certificate applicable to the first operational mode. In some embodiments, the SE determines the provisioning server uses the first operational mode for the RSP process based on an identifier in the message. In some embodiments, the message from the LPA includes an explicit command to cause the SE to use the first operational mode for the RSP process. In some embodiments, the LPA determines the provisioning server uses the first operational mode before establishing the TLS based on information obtained about the provisioning server before initiating the RSP process. In some embodiments, the LPA determines the provisioning server uses the first operational mode after establishing the TLS based at least in part on information provided by the provisioning server during establishment of the TLS. In some embodiments, the provisioning server includes a subscription manager data preparation (SM-DP) server.

In some embodiments, an apparatus configurable for operation in a wireless device includes: one or more processors; and a memory communicatively coupled to the one or more processors and storing instructions that, when executed by the one or more processors, causes the wireless device to perform operations that include: (i) detecting a request to provision a higher layer operating system (OS) bundle for a first industry sector; (ii) selecting a wireless device security certificate associated with the first industry sector; (iii) sending a request to a network entity to provision the higher layer OS bundle, the request including an identifier for the first industry sector and a first signature generated based on the wireless device security certificate; (iv) receiving from the network entity the higher layer OS bundle including a second signature generated by the network entity using a server security certificate associated with the first industry sector; (v) verifying the higher layer OS bundle using a certificate authority associated with the server security certificate; and (vi) upon successful verification, installing the higher layer OS bundle in the wireless device.

In some embodiments: the first industry sector corresponds to a telecommunications industry sector; the higher layer OS bundle includes credentials for access to a cellular wireless service; and the network entity includes a provisioning server. In some embodiments, the wireless device security certificate and the server security certificate are issued by the same certificate authority. In some embodiments, the wireless device security certificate and the server security certificate are issued by distinct certificate authorities that each serve a telecommunications industry sector. In some embodiments, the wireless device includes multiple device security certificates, at least two device security certificates corresponding to different industry sectors.

Representative Exemplary Apparatus

Figure 7:
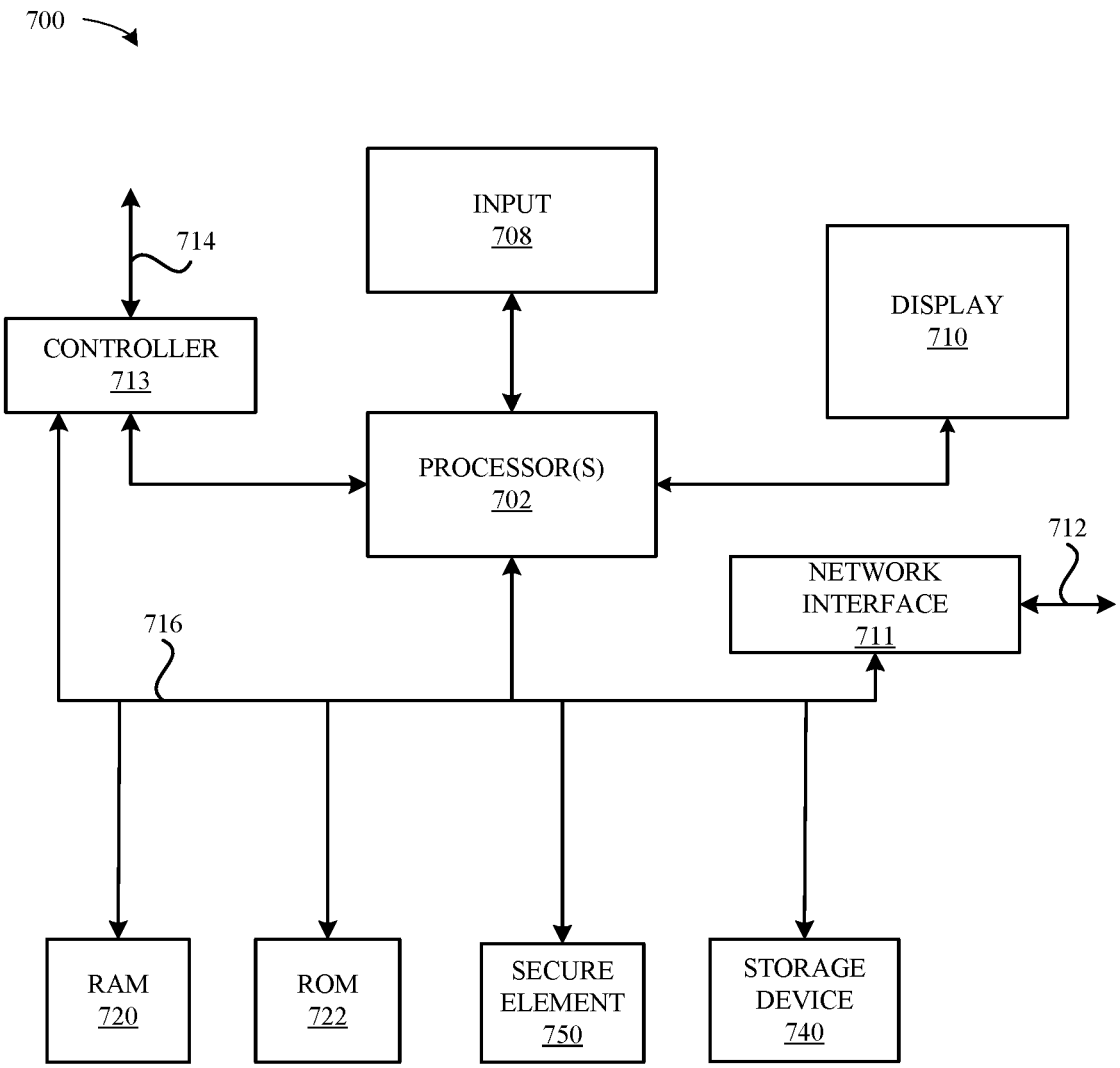
FIG. 7 illustrates a detailed view of a representative computing device that can be used to implement various methods described herein, according to some embodiments.

FIG. 7 illustrates a detailed view of a representative computing device 700 that can be used to implement various methods described herein, according to some embodiments. In particular, the detailed view illustrates various components that can be included in the UE 111. As shown in FIG. 7, the computing device 700 can includes one or more processors 702, which can represent microprocessors and/or controllers for controlling at least a portion of overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 that can be controlled by the processor(s) 702 to display information to the user. A data bus 716 can facilitate data transfer between at least a storage device 740, the processor(s) 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also includes a storage device 740, which can include a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 422. The ROM 722 can store programs, utilities or processes to be executed in a non-volatile manner. The RAM 720 can provide volatile data storage, and stores instructions related to the operation of the computing device 700. The computing device 700 can further include a secure element (SE) 750, which can represent an eUICC 108 or an SSP 202 of the UE 111.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) radio access technologies (RATs). In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for switching between multiple security certificates stored in a wireless device to support different functions for different industry sectors, the method comprising:
by the wireless device:
detecting a request to provision a higher layer operating system (OS) bundle for a first industry sector;
selecting a wireless device security certificate associated with the first industry sector;
sending a request to a network entity to provision the higher layer OS bundle, the request including an identifier for the first industry sector and a first signature generated based on the wireless device security certificate;
receiving, from the network entity, the higher layer OS bundle including a second signature generated by the network entity using a server security certificate associated with the first industry sector;
verifying the higher layer OS bundle using a certificate authority associated with the server security certificate; and
upon successful verification, installing the higher layer OS bundle in the wireless device,
wherein:
the multiple security certificates include the wireless device security certificate associated with the first industry sector and a second wireless device security certificate associated with a second industry sector different from the first industry sector.

2. The method of claim 1, wherein the first industry sector corresponds to one of: a telecommunications industry sector, an electronics payment industry sector, a digital identification industry sector, a digital rights management industry sector, or an Internet of Things (IoT) industry sector.

3. The method of claim 2, wherein the first industry sector corresponds to the telecommunications industry sector and the higher layer OS bundle includes credentials for access to a cellular wireless service.

4. The method of claim 3, wherein the network entity comprises a provisioning server.

5. The method of claim 1, wherein the wireless device security certificate and the server security certificate are issued by the same certificate authority.

6. The method of claim 1, wherein the wireless device security certificate and the server security certificate are issued by distinct certificate authorities that each serve a telecommunications industry sector.

7. The method of claim 1, wherein the first industry sector corresponds to a telecommunications industry sector and the second industry sector corresponds to an electronic payments industry sector.

8. The method of claim 7, wherein:
the wireless device security certificate is issued by a first certificate authority that serves the telecommunications industry sector; and
the second wireless device security certificate is issued by a second certificate authority that serves the electronics payments industry sector and is distinct from the first certificate authority.

9. A method of triggering operational mode switching during a remote subscriber identity module (SIM) provisioning (RSP) process, the method comprising:
by a local profile assistant (LPA) executing on hardware of a wireless device external to a secure element (SE) of the wireless device:
establishing a transport level security (TLS) with a provisioning server;
determining i) the provisioning server uses a first operational mode for the RSP process based on a version number for a server security certificate for the provisioning server, and ii) the (SE) of the wireless device is initially operating in a second operational mode for the RSP process, the second operational mode incompatible with the first operational mode; and providing a message to the SE that indicates the provisioning server operates in the first operational mode; and by the SE of the wireless device:

determining the provisioning server uses the first operational mode for the RSP process based on the message provided by the LPA;

switching from the second operational mode to the first operational mode for the RSP process; and executing the RSP process using the first operational mode to obtain an electronic SIM or to update a previously obtained electronic SIM from the provisioning server.

10. The method of claim 9, wherein the message from the LPA comprises a message forwarded from the provisioning server, the message including a signature that uses a server security certificate applicable to the first operational mode.

11. The method of claim 10, wherein the SE determines the provisioning server uses the first operational mode for the RSP process based on an identifier in the message.

12. The method of claim 9, wherein the message from the LPA comprises an explicit command to cause the SE to use the first operational mode for the RSP process.

13. The method of claim 12, wherein the LPA determines the provisioning server uses the first operational mode before establishing the TLS based on information obtained about the provisioning server before initiating the RSP process.

14. The method of claim 12, wherein the LPA determines the provisioning server uses the first operational mode after establishing the TLS based at least in part on information provided by the provisioning server during establishment of the TLS.

15. The method of claim 9, wherein the provisioning server comprises a subscription manager data preparation (SM-DP) server.

16. An apparatus configurable for operation in a wireless device, the apparatus comprising:

one or more processors; and a memory communicatively coupled to the one or more processors and storing instructions that, when executed by the one or more processors, causes the wireless device to perform operations that include:

detecting a request to provision a higher layer operating system (OS) bundle for a first industry sector;

selecting a wireless device security certificate associated with the first industry sector;

sending a request to a network entity to provision the higher layer OS bundle, the request including an identifier for the first industry sector and a first signature generated based on the wireless device security certificate;

receiving from the network entity the higher layer OS bundle including a second signature generated by the network entity using a server security certificate associated with the first industry sector;

verifying the higher layer OS bundle using a certificate authority associated with the server security certificate; and upon successful verification, installing the higher layer OS bundle in the wireless device, wherein:

the wireless device stores multiple security certificates include the wireless device security certificate associated with the first industry sector and a second wireless device security certificate associated with a second industry sector different from the first industry sector.

17. The apparatus of claim 16, wherein:

the first industry sector corresponds to a telecommunications industry sector;

the higher layer OS bundle includes credentials for access to a cellular wireless service; and the network entity comprises a provisioning server.

18. The apparatus of claim 16, wherein the wireless device security certificate and the server security certificate are issued by the same certificate authority.

19. The apparatus of claim 16, wherein the wireless device security certificate and the server security certificate are issued by distinct certificate authorities that each serve a telecommunications industry sector.

20. The apparatus of claim 16, wherein the wireless device comprises multiple device security certificates, at least two device security certificates corresponding to different industry sectors.

* * * * *

UNITED STATES PATENT AND TRADEMARK OFFICE
CERTIFICATE OF CORRECTION

| | | |
|---|---|---|
| PATENT NO. | : 11,290,268 B2 | Page 1 of 1 |
| APPLICATION NO. | : 16/566723 | |
| DATED | : March 29, 2022 | |
| INVENTOR(S) | : Xiangying Yang et al. | |

It is certified that error appears in the above-identified patent and that said Letters Patent is hereby corrected as shown below:

In the Claims

In Claim 9, at Column 18, Line 66: "the provisioning server, and ii) the (SE) of the" should read -- the provisioning server, and ii) the SE of the --.

Signed and Sealed this
Eleventh Day of July, 2023

Katherine Kelly Vidal
*Director of the United States Patent and Trademark Office*